3,360,474
COMPOSITION FOR TREATING USED DRY CLEANING SOLVENTS

Warren K. Cooley, Brookeville, Md., and Ralph T. Mease, Washington, D.C., assignors to Caled Products Company, Inc., Brentwood, Md., a corporation of Maryland
No Drawing. Filed Nov. 5, 1963, Ser. No. 321,418
2 Claims. (Cl. 252—259.5)

This invention relates to methods for treating dry cleaning solvents to remove therefrom impurities which have accumulated and built up in the solvents on continued use, and to the compositions used in such methods.

In the cleaning of clothes and other textiles generally, hereinafter broadly referred to as "garments," the garments are washed in an organic solvent. These solvents usually are petroleum distillates or halogen-containing synthetic solvents. Those conventionally used include Stoddard Solvent, 140F. solvent, "fast drying solvent," chlorinated solvents, as typified by perchlorethylene or fluorine-containing synthetic solvents. Stoddard Solvent and "fast drying solvent" are petroleum distillates having a flash point of about 106° F. The "fast drying solvent" differs from Stoddard Solvent essentially in that it does not include some of the higher boiling fractions. 140F. solvent is a petroleum distillate having a minimum flash point of 140° F.

In the dry cleaning operation the garments are agitated in the dry cleaning fluid for a period of time with a continuous filtration process, are then extracted by centrifugal action, then air dried and pressed, if required.

The dry cleaning solvent performs two primary functions. Firstly, it washes out from the garments particles such as sand and other insoluble-type material, known commonly as "soil." Secondly, it removes from the garments those impurities which are soluble in the dry cleaning solvent. The solvent used in the cleaning operation and extracted by the centrifugal drying is filtered before reuse, but the soluble substances removed from the garments remain in the solvent and, after repeated use, the solvent becomes discolored and charged with impurities to an extent that the garments, after the cleaning operation, will still contain a significant percentage of soluble impurities and the color of the garment may be adversely affected.

Various methods have been heretofore proposed for treating used solvents to remove undesirable soluble impurities. The use of "filter powders" such as diatomaceous earth and of activated carbon in the filtering operation is not uncommon, and additives for the solvent before filtering to effect a chemical reaction with some of the impurities are marketed under various trade names. These additives consist usually of alkaline materials such as soda-ash, lime, and alkaline-earth compounds. The use of these expedients does somewhat prolong the period that the solvents may be used with satisfactory results, but today there is no known treatment which removes enough of the objectionable soluble impurities, or sufficiently improves the color of the solvents to significantly prolong the period of use of the solvent.

By the technique reiterated in this application a much larger portion of the objectionable soluble impurities removed from the garment by the dry cleaning process is removed from the solvent, and the color of the solvent is also greatly improved.

The essential feature of this invention is the formation in the solvent of a dispersion or a colloidal suspension which, in effect, collects the impurities in the solvent and which can then be removed by filtration. It has been found that various liquids which are immiscible with the dry cleaning solvents, when added to the solvent, form an emulsion which will attract to itself or occlude some of the soluble impurities present in the dry cleaning solvent and will also attract or occlude a much larger percentage of the prior art additives which are used for dry cleaning solvents and which are not removed by well known filtering methods which give to the dry cleaning a dark color.

In treating used solvent by the invention of this application, the procedure, which has at this date been found most effective, is to add to the used solvent a mixture consisting of 44 parts diatomaceous earth, 56 parts ethylene glycol containing 3% sodium carbonate in solution, 20 parts soda-ash and 20 parts slaked lime, all parts being by weight.

The mixture is added to the used solvent in the proportion of four to eight pounds of the mixture to 100 gallons of used solvent and then run in the washer for 15 or 20 minutes to thoroughly agitate the mixture. The mixture is then run through the filter and returned to the washer. The process may then be repeated if desired.

The diatomaceous earth serves its usual function of a filter aid. The ethylene glycol, which wets the filter aid, solubilizes impurities which are more soluble in the ethylene glycol than in the dry cleaning solvent, due to its preference to the ethylene glycol. It is believed that a colloidal suspension is thereby formed within the dry cleaning solvent with the impurities soluble within the ethylene glycol which wets the diatomaceous earth. The diatomaceous earth then agglomerates together for easy removal by the filter. However, whatever may be the precise effect of the added ethylene glycol or other polyhydroxy alcohol, a much greater purification of the solvent is obtained than by any previously used process.

Other polyhydroxy alcohols which have been found effective are: diethylene glycol, propylene glycol, glycerine, triethylene glycol.

It is believed that any anhydrous liquid which is immiscible with the dry cleaning solvent, which is chemically inert, which has physical characteristics similar to those of the above-mentioned polyhydroxy alcohols which will form in the solvent a colloidal suspension with a filter aid and which will collect such soluble impurities in the dry cleaning solvent as the impurities are wetted by the suspension, may be removed by filtration and thereby effectively utilized with the teachings of this invention.

While the nature and relative proportions of the soluble impurities in used dry cleaning solvents vary considerably, fatty acids and soaps usually make up a major proportion of the impurities and before and after quantitative analyses for these two types of impurities, and before and after color comparisons, furnish a substantially accurate measure of the effectiveness of the intermediate treatment.

The analysis of a sample of used solvent from a fairly large dry cleaning establishment serving the general public in a large city indicated a fatty acid content of .314% and a soap content of 1.10%. The sample was so discolored that it was no longer safely useable for light-colored garments.

After the first treatment by the procedure above described, the fatty acid content was reduced to .114% and the soap to .77%. The color was also significantly improved. After the second treatment, the analysis showed no fatty acid and the soap was reduced to .19%, and the solvent was substantially colorless.

The proportions of the several substances making up the preferred composition are not critical and may be varied at least plus or minus 25% without significantly affecting the results.

If double the quantity of the composition be added to the solvent for the first treatment a greater reduction in the fatty acid and soap content will be obtained than by the first treatment with the quantity above stated, but the results obtained with the double quantity one step process are not quite as good as with the two step process.

It will, of course, be understood that other alkalies and other filter aids, particularly those now used in the dry cleaning industry, may be substituted for those mentioned above, and that the process may be otherwise modified within the scope of the appended claims.

We claim:

1. A composition for treating used dry cleaning solvents that consists essentially of about 35 to 53 parts by weight of a filtering powder, about 44 to 65 parts by weight of a polyhydroxy alcohol and about 37 to 46 parts by weight of an alkaline material selected from the group consisting of calcium oxide and sodium carbonate.

2. A composition for treating used dry cleaning solvent which consists essentially of diatomaceous earth from about 35 to 53 parts, ethylene glycol, containing approximately 3% of dissolved sodium carbonate, about 45 to 67 parts, sodium carbonate from about 18 to 22 parts, and lime from 18 to 22 parts, all parts being by weight.

References Cited

UNITED STATES PATENTS

| | | | |
|---|---|---|---|
| 507,586 | 10/1893 | Ling | 252—159 |
| 1,160,394 | 11/1915 | Ellis | 252—159 |
| 1,621,906 | 3/1927 | Schless | 252—159 |
| 3,031,409 | 4/1962 | Perlman et al. | 252—159 X |

LEON D. ROSDOL, *Primary Examiner.*

R. D. LOVERING, *Assistant Examiner.*